US006314478B1

(12) United States Patent
Etcheverry

(10) Patent No.: US 6,314,478 B1
(45) Date of Patent: Nov. 6, 2001

(54) SYSTEM FOR ACCESSING A SPACE APPENDED TO A CIRCULAR QUEUE AFTER TRAVERSING AN END OF THE QUEUE AND UPON COMPLETION COPYING DATA BACK TO THE QUEUE

(75) Inventor: William R. Etcheverry, Irving, TX (US)

(73) Assignee: NEC America, Inc., Melville, NY (US)

( * ) Notice: Subject to any disclaimer, the term of this patent is extended or adjusted under 35 U.S.C. 154(b) by 0 days.

(21) Appl. No.: 09/222,378

(22) Filed: Dec. 29, 1998

(51) Int. Cl.[7] ....................................................... G06F 13/14
(52) U.S. Cl. ............................ 710/29; 701/102; 358/1.14; 358/1.15
(58) Field of Search ................................. 710/29, 52, 53; 701/102; 358/1.14, 1.15

(56) References Cited

U.S. PATENT DOCUMENTS

| 5,235,676 | * | 8/1993 | Clay et al. ............................. 395/113 |
| 5,446,839 | | 8/1995 | Dea et al. .............................. 395/163 |
| 5,450,544 | | 9/1995 | Dixon et al. ........................... 395/164 |
| 5,515,082 | | 5/1996 | Hirschauer et al. .................. 345/192 |
| 5,519,701 | | 5/1996 | Colmant et al. ...................... 370/60.1 |
| 5,584,038 | | 12/1996 | Papworth et al. .................... 395/800 |
| 5,623,608 | | 4/1997 | Ng ......................................... 395/250 |
| 5,623,621 | | 4/1997 | Garde .................................. 395/421.1 |
| 5,689,693 | | 11/1997 | White .................................... 395/375 |
| 5,694,125 | | 12/1997 | Owsley et al. ......................... 741/50 |
| 5,699,530 | | 12/1997 | Rust et al. ............................. 395/250 |
| 5,832,307 | | 11/1998 | Crary ..................................... 710/52 |
| 5,845,092 | | 12/1998 | Hseih ................................... 395/2.09 |
| 5,870,627 | | 2/1999 | O'Toole et al. ........................ 710/22 |
| 5,873,089 | | 2/1999 | Regache ................................ 707/100 |
| 5,968,107 | * | 10/1999 | Vogan et al. ......................... 701/102 |
| 6,000,001 | | 12/1999 | Larsen ................................... 710/244 |
| 6,044,419 | * | 3/2000 | Hayek et al. ........................... 710/57 |
| 6,044,434 | | 3/2000 | Oliver ................................... 711/110 |
| 6,112,266 | | 8/2000 | Yeh ........................................ 710/52 |

FOREIGN PATENT DOCUMENTS 2 350 533 A    11/2000   (GB) .

* cited by examiner

Primary Examiner—Thomas Lee
Assistant Examiner—Abdelmoniem Elamin
(74) Attorney, Agent, or Firm—Scully, Scott, Murphy & Presser

(57) ABSTRACT

A circular queue system is implemented using either a 'mirror space' appended to the circular portion of the queue (or buffer) or an 'borrow' space appended to the circular portion of the queue (or buffer). In each implementation, address verification or checking within the queue is not implemented until such time as the read or write portion to the queue has substantially completed. Where the address would normally exceed the physical or logical end address of the circular queue, the 'mirror space' or 'borrow' space provides sufficient storage to prevent overflow into other valid data. Upon substantial completion of the read or write to the queue (or buffer), the present address of the pointer is determined, and where the circular portion of the queue (or buffer) has been traversed, the data in the 'mirror space' is copied into the circular queue (or buffer) and the pointer's address is repositioned to be within the circular queue (or buffer), or for a 'borrow' space, the pointer's address is reset to the queue's (or buffer's) physical or logical start address.

34 Claims, 11 Drawing Sheets

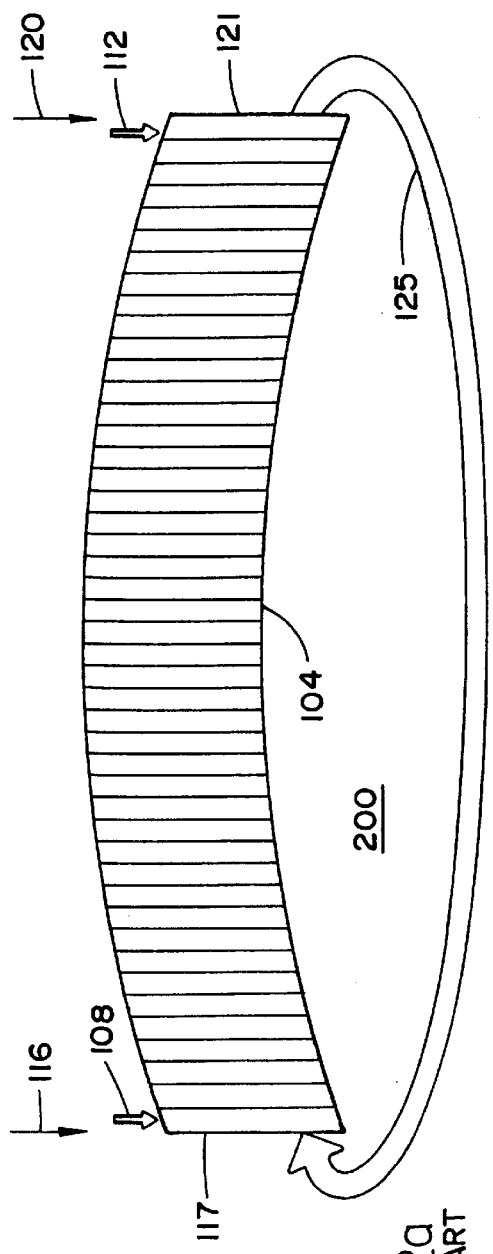
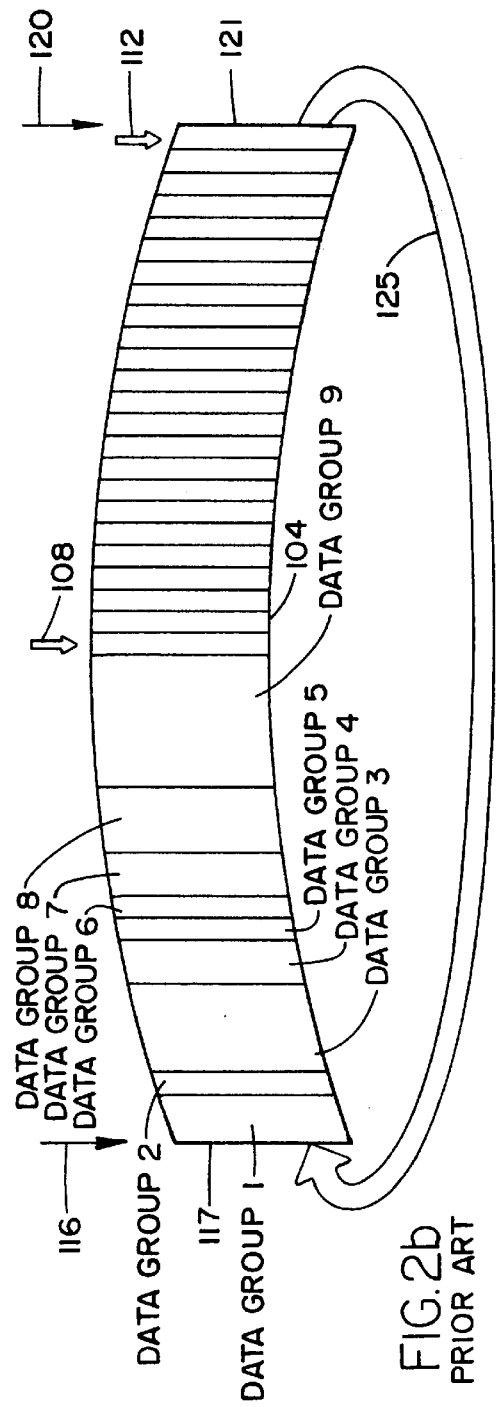
FIG. 2a PRIOR ART
FIG. 2b PRIOR ART

SYSTEM FOR ACCESSING A SPACE APPENDED TO A CIRCULAR QUEUE AFTER TRAVERSING AN END OF THE QUEUE AND UPON COMPLETION COPYING DATA BACK TO THE QUEUE

FIELD OF THE INVENTION

The present invention generally relates to the field of queues or buffers as used in computing systems. More specifically, the present invention relates to those queues or buffers which behave or are intended to behave as circular queues or buffers. Particularly, the invention relates to those circular queues or buffers which are used for high speed communications between a first processor or system and a second processor or system.

BACKGROUND OF THE INVENTION

Typically, circular First In—First Out (FIFO) buffers or queues exist for numerous purposes including utilizing available memory resources effectively and repetitively, storing information where short term data transfer rates exceed the available temporary processing or transferring ability of the microprocessors or the like, and for temporary storage of data where the data size is limited but presently unknown or likely to be variable. FIFO buffers or queues can also be used for servicing hardware interrupts, cycling of software programs, for data shifting or manipulations, and for other purposes well known in the art. Circular FIFO buffers have likewise proven beneficial in the transfer of data both to and from communication devices and for other communication related applications. Typically, in certain communications applications or data transfer applications, the FIFO buffer or queue is first implemented in the hardware transmitting data or the hardware receiving data. Additional circular buffers or queues can be employed to move the received or transmitted data from or to the receiving or transmitting hardware.

Current FIFO buffers can be realized using one or more of many different mechanisms, including hardware implementation, software allocation, or a combination employing both hardware and software. A hardware implementation could include dedicated memory of a Central Processing Unit (CPU) using Dynamic Random Access Memories (DRAM), high speed memory, cache memory, or the like. Generally, at least two pointers are implemented in a circular FIFO buffer or queue. For example, the write pointer maintains the next or current available position in or for writing in the DRAM, memory, or storage space. The read pointer maintains the next or current position for retrieving data from the DRAM, memory, or storage space. It is customary to refer to the read pointer and write pointer as head pointer and tail pointer, or vice-versa, and therefore, herein they will be referred to specifically as 'read pointer' and 'write pointer' for clarity.

Additional types of control elements may be implemented in a circular queue or buffer. Optional pointers can exist for control in a circular FIFO buffer or system, including a data end pointer, one or more transfer pointers for execution of branching instructions, as well as others. Furthermore, one or more indexes or flags or the actual queue or buffer data can be used to implement queue or buffer control.

Optional control elements for the queue include buffer status indicators such as queue full, queue almost full, queue empty, queue almost empty, as well as other optional indicators such as data packet size, data size, transfer complete, data overrun, invalid request, free-count, used-count, a data loaded flag, and the like. These control elements have been added to circular queues to monitor or implement the 'circular' behavior of the queue, while actually implementing the circular queue using a linear physical addressing scheme or in a linear or matrixed (x by y addressing) memory array or data storage structure.

Referring briefly to FIG. 2a, shown is a general overview of a prior art circular queue, or FIFO buffer, comprising numerous individual buffer storage elements 104, a physical start address 117 which may be referenced by a logical start address 116, a physical end address 121 which may be referenced by a logical end address 120, a write address pointer 108, and a read address pointer 112. The 'circular' nature of this FIFO queue is shown by demonstrative return path 125, whereby upon reaching logical end address 120 or physical end address 121, the appropriate pointer resets to the logical start address 116 or physical start address 117. In effect and by deliberate implementation, as physical end address 121 is reached, the incrementation of any particular logical or physical pointer referencing storage elements within the circular queue 200, including either read address pointer 112 or write address pointer 108, results in the pointer crossing the physical end address 121 to be reset to the logical or physical address at the physical start address 117. For pointer addresses which exceed physical end address 121, then to determine the appropriate pointer address within the circular queue, a multiplicative factor of physical end address 121 minus physical start address 117 is subtracted from the pointer address to reduce its value to an address value less than the physical end address 121 but greater than or equal to the physical start address 117. In most present day systems, this is typically done by taking the modulus of the address divided by logical end address 120 when the logical start address 116 address is zero.

As demonstrated in FIG. 2a, the buffer storage elements 104 are entirely empty. The write address pointer 108 points to the first available data storage element which is unused and available for data storage. The read address pointer 112 likewise points to the last used buffer storage elements 104, or initialized (as shown therein) to the logical end address 120. As data is written into the circular queue 200, the buffer storage elements 104 fill as necessary to store data. As each portion or piece of data is written, a check is made to ensure write address pointer 108 has not exceeded logical end address 120 (or physical end address 121) and read address pointer 112. Thereafter, write address pointer 108 moves to point to the next available storage element address, as is shown in FIG. 2b by the storage of Data Groups (1) through (9), Upon reaching logical end address 120 or physical end address 121, the address of write address pointer 108 is reset to logical start address 116 or physical start address 117. As shown in FIG. 2b, no read process has yet occurred in the queue of FIG. 2b as the read address pointer 112 remains at its initialized position.

As shown in FIG. 2c, the operation of the circular queue 200 has completed data storage into each of the buffer storage elements 104, and has begun the reading process as data groups less than Data Group (24) have been read, as indicated by the shift in position of read address pointer 112. Also shown in FIG. 2c is the write of Data Group (31) across physical end address 121, resulting in a first data group portion being written (identified as Data Group (31A)) up to logical end address 120, and a second portion being written (identified as Data Group (31B)) starting from logical start address 116. Data Group (31A) in combination with Data Group (31B) is computationally or logically treated as a continuous single data group by the appropriate use of pointers, control functions, logic circuits and the like to effectively make a linear storage system of circular queue 200 appear or function 'circular'.

Referring next to FIG. 2d, shown is circular queue 200 where the queue is functionally full of data comprised of the Data Groups (41)–(50). The storage element wherein write address pointer 108 and read address pointer 112 both reside in the same storage element wherein no presently valid data exists. Typically, write address pointer 108 is not permitted to proceed to (or in certain designs pass) the exact position of read address pointer 112. Likewise, read address pointer 112 is not permitted to proceed to (or in certain designs pass) the exact position of write address pointer 108. However, contingent upon the particular circular queue design, write address pointer 108 could proceed up to the exact position of read address pointer 112, or vice-versa. Such a design may require queue empty and/or queue full status bits, depending upon whether a read or whether a write procedure was occuring immediately prior to the equivalency of addresses for write address pointer 108 and read address pointer 112.

BRIEF SUMMARY OF THE INVENTION

An arrangement is described wherein one embodiment of the present invention provides a mirror space which functions to permit read and write operations to the circular queue to proceed whereby the present position of a queue pointer need not be known or verified until after the access (a read or a write or combination thereof) process is substantially completed.

In one embodiment of the present invention, a circular queue and its operation is described which is intended to overcome certain disadvantages of the existing art, namely, permitting read or write access to the circular queue in a manner wherein a pointer address is not verified after each and every read from or write to a storage element of the circular queue, while optionally simultaneously maintaining the functionality of a circular queue for existing functions or subroutine calls.

It is one object of the present invention is to provide a new and improved circular queue whereby the accessing of data to and from the circular queue can occur at a faster rate than existing circular queues or at an efficiency which is higher than an equivalent circular only queue.

It is another object of the present invention to provide a circular queue which does not check for the positional or address status of the particular pointer or pointers in use during a read or write operation to the circular queue until such time as the read or write operation is substantially completed.

It is still another object of the present invention to not update the position of pointer after each and every write or read to a storage element. This permits much more efficient use of time for the write and read operations, and is particularly beneficial where the data transfer rate into the circular queue approaches the ability of the controlling processor, controller, or input output device, system component, time available, or the like, to write or read such data.

BRIEF DESCRIPTION OF THE DRAWINGS

The present invention will be described in further detail with reference to the accompanying drawings, in which:

FIG. 2a is a block diagram of an empty or unused prior art circular queue;

FIG. 2b is a block diagram of partly written prior art circular queue;

Appendix A is a software listing of a program implementing an embodiment of the present invention.

To further assist in understanding the inventive concepts contained herein, and for clarity, those descriptive elements which are similar in nature or which function similarly will maintain their numbering throughout all the figures herein.

DETAILED DESCRIPTION OF THE PREFERRED EMBODIMENTS

Figure 1:
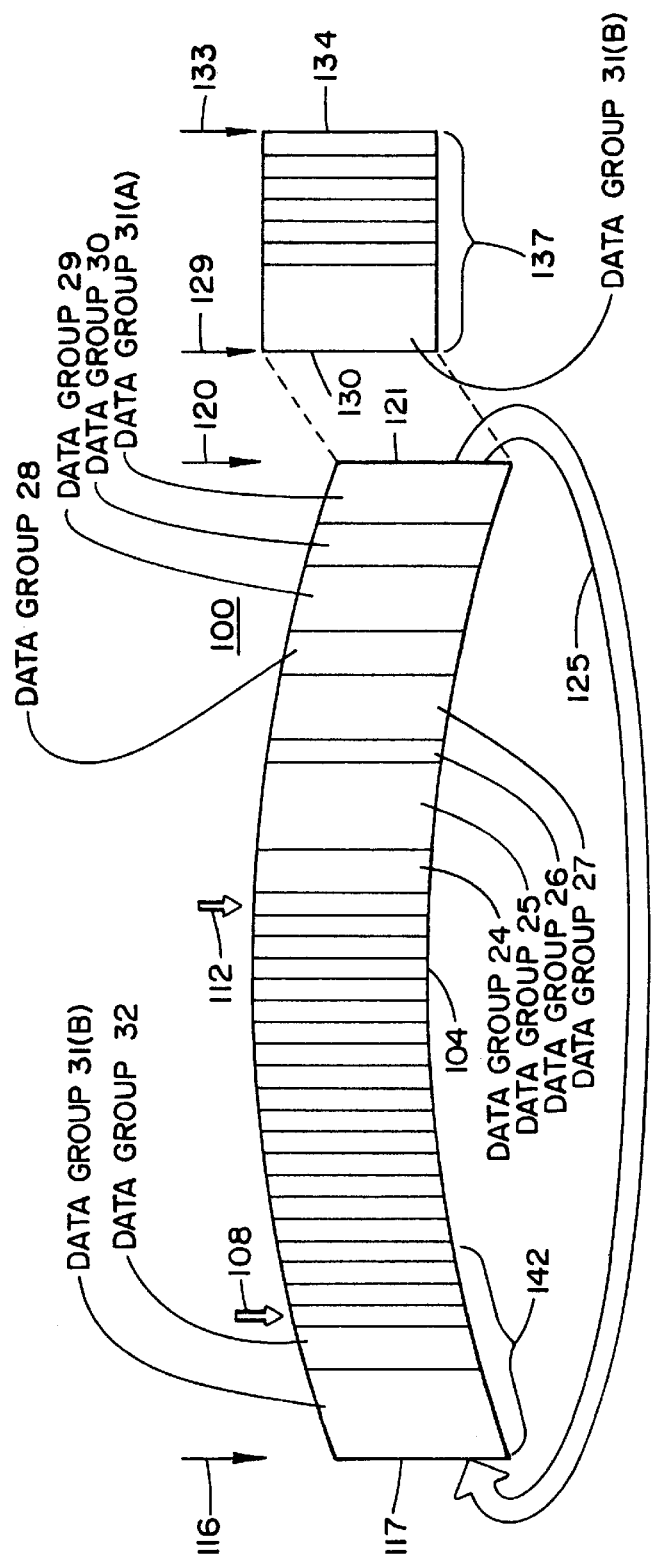
FIG. 1 is a block diagram the circular queue according to the present invention.
Figure 2C:
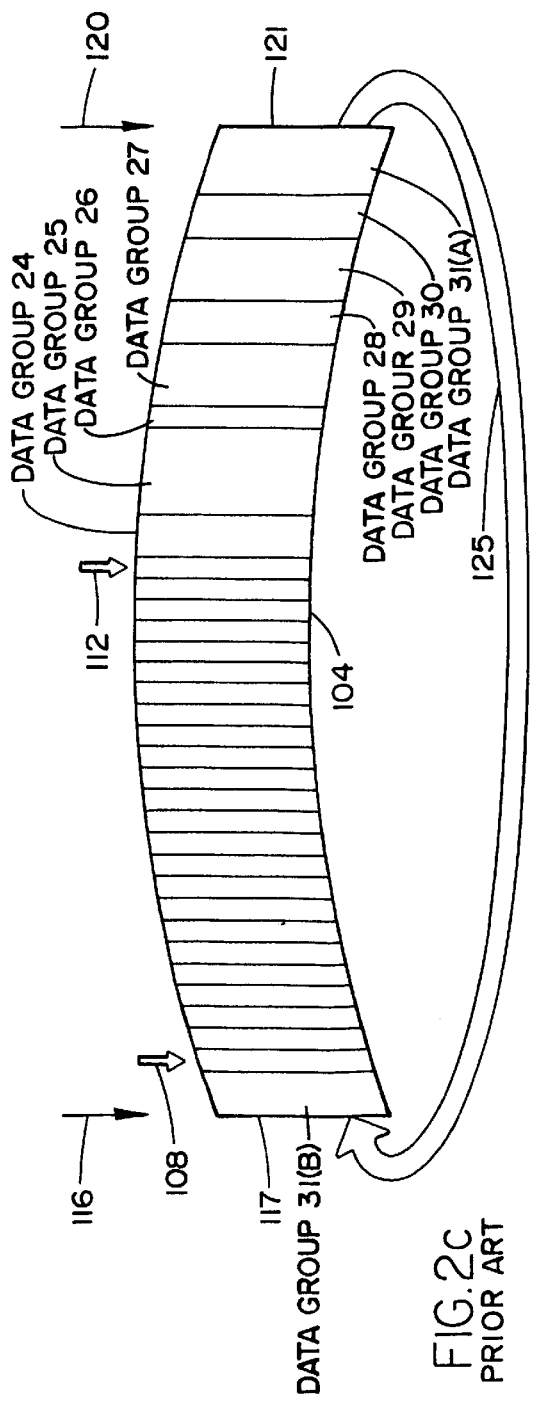
FIG. 2c is a block diagram of prior art circular queue which is being read.
Figure 2D:
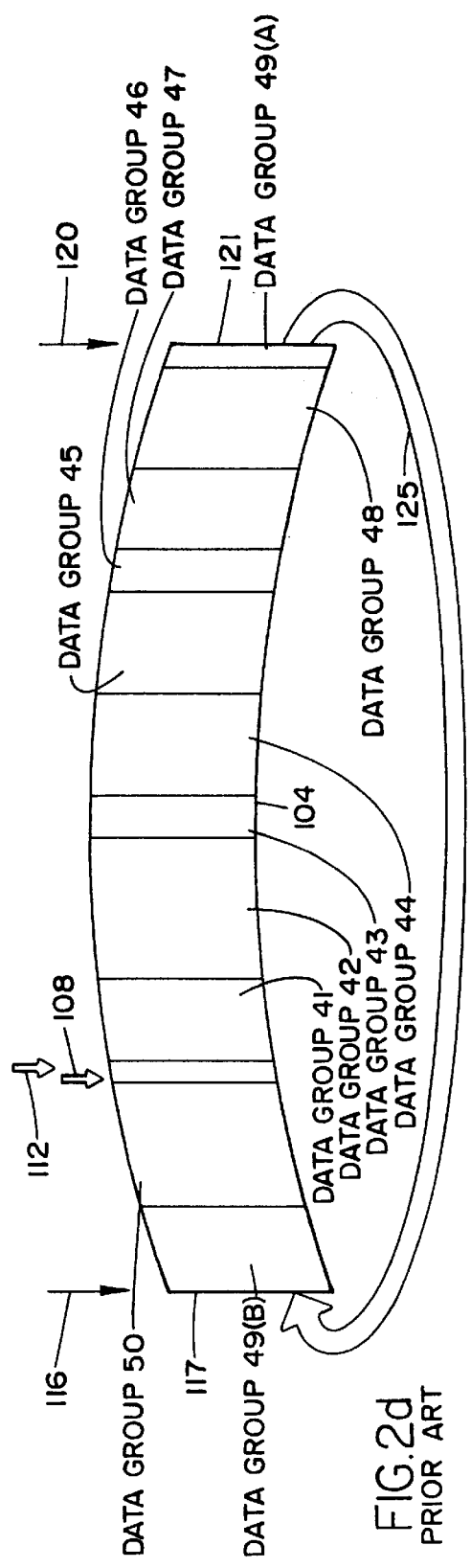
FIG. 2d is a block diagram of completely full prior art circular queue.

Referring generally to FIG. 1, it shows an overall block diagram of a first preferred embodiment of the invention incorporating and including the inventive concepts disclosed herein, as well as one combination of functional blocks which include the inventive concepts of this invention. Shown in FIG. 1 are related components of a first preferred embodiment, namely, buffer storage elements 104, write address pointer 108, read address pointer 112, mirror space storage elements 137, and logical end address 120.

For clarity, most terms used herein will be discussed as they are contemporarily used or likely to be understood by those practicing in the art of software programming. However, certain terms are generalized to convey the generalization of the inventive concepts described herein. For instance, 'storage element', as used herein, can typically comprise one or more of many particular implementing methods or devices, and may include: 1) a single bit; 2) a byte; 3) a programming array addressable element; 4) a block of bytes; 5) a hardware addressable memory byte; 6) a hardware addressable memory block of bytes; 7) blocks of memory; and 8) the like. Likewise, as used herein, 'data' or 'data group' will comprise one or more of many particular implementing methods or programmatic structures including: 1) a program variable; 2) computer bits or bytes; 3) program instructions; 4) fixed records; 5) combinations of variable pieces of digital information; and, 6) the like. Furthermore, as used herein, the terms 'data' or 'data group' may also refer one or more parts of the representational information expected to be stored or actually as stored in the storage elements. Typically, the term 'address' as used herein will define the physical or logical method of locating one, or perhaps more than one, storage element for either reading or writing the identified storage element or elements.

The discussion below will typically described in regards to a write process to the circular queue; however, the inventive concepts discussed herein are equally adaptable to a read process in the circular queue and are also adaptable to generic read and/or write access processes within the circular queue and its related storage elements. Likewise, address pointers, as described herein, will typically refer to the next available storage element; however, the inventive concepts described herein are equally adaptable to other pointing schemes or methods which may be used for circular queues, FIG. 1 shows in a first embodiment the inventive concepts of the invention. The circular queue 100 is designed or implemented in such a way that the first storage element of mirror space storage elements 137 is at least logically continuous by logical address to logical end address 120. Where addressing of the circular queue 100 is by physical addresses as opposed to logical addresses, then mirror space storage elements 137 will be physically address continuous as well as logically address continuous at the boundary of physical end address 121 (or logical end address 120). Therefore, where the addressing scheme used to address buffer storage elements 104 and mirror space storage elements 137 requires physical addressing, then mirror space storage elements 137, namely its first constituent storage element, must be next or sequential in both physical and logical address sequence to physical end address 121 and logical end address 120, respectively. As shown, logical end address 120 will denote the last available physical address within the circular portion of circular queue 100, while mirror space logical start address 129 will denote the first available physical address for the mirror space storage elements 137, i.e., those elements not within the circular portion of circular queue 100 or occurring after physical end address 121.

When using a only a logical addressing scheme, logical end address 120 and mirror space logical start address 129 need only be logically address sequential, and can be optionally physically address non-sequential. Typically, it is preferable to maintain both the physical sequence and logical sequence of buffer storage elements 104 and mirror space storage elements 137, thereby permitting both physical and logical addressing to the circular queue 100.

Figure 3:
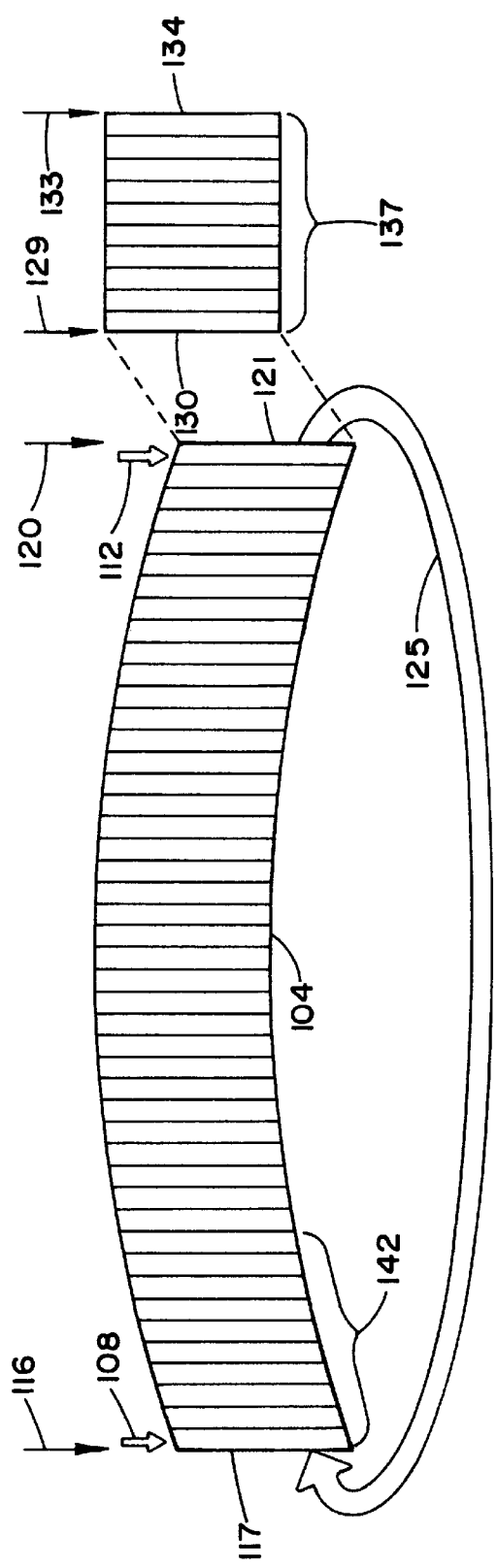
FIG. 3 is a block diagram of an empty circular queue according to the present invention.
Figure 4:
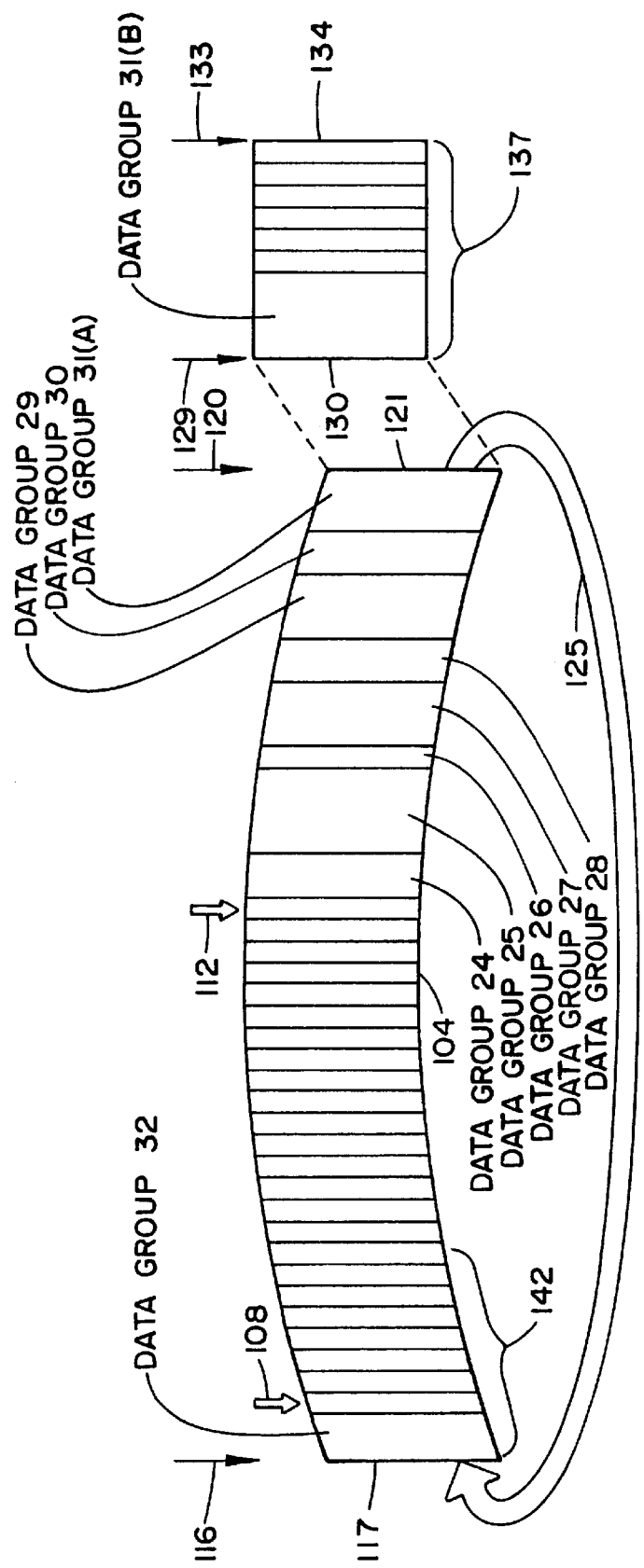
FIG. 4 is a block diagram of partly written circular queue using a mirror space according to one embodiment of the present invention.

As is similar to the description of operation described regarding FIG.'s 2a–d, the circular queue 100 of FIG. 1 and FIG. 3 operates in a similar manner except for: 1) operations relating to the storage or retrieval of data into storage elements of buffer storage elements 104 wherein no addressing checking or verification is done on a storage element by storage element basis; and 2) the operations relating to the operation of mirror space storage elements 137 and circular queue copy storage elements 142, if applicable.

As shown in FIG. 3, an entirely empty queue is shown, wherein write address pointer 108 points to the first available storage element, and read address pointer 112 points to the last storage element read, or as shown, initialized to the last storage element of buffer storage elements 104. However, the storage elements of circular queue copy storage elements 142 are 'mirrored' by the storage elements of mirror space storage elements 137. Functionally, the corresponding storage elements of mirror space storage elements 137 will be identical in function to their corresponding storage elements of circular queue copy storage elements 142, except that the storage elements of mirror space storage elements 137 are at different physical addresses and logical addresses from their 'identical' counterparts in circular queue copy storage elements 142. Usually, the addresses of mirror space storage elements 137 will be offset by the size of buffer storage elements 104.

Referring again to FIG. 1, the state of buffer storage elements 104 is shown after a period of writing and reading data to and from the queue. As shown in FIG. 1, Data Group (31) is effectively divided into two subgroups comprising Data Group 31(A) and Data Group 31(B). Data Group (31) is written or stored into buffer storage elements 104 up to physical end address 121, thereby creating Data Group (31A). Data Group (31B) is effectively created by continuing to write Data Group (31) after the write process exceeds or traverses physical end address 121 and continues to write into mirror space storage elements 137. The write process (or read process) of the present invention differs from prior art in that all the data to be written (read) is first written (read) and then a positional update of the appropriate pointer is made subsequent to the writing or storing process (or reading or retrieving process). Once the storage of Data Group (31) has completed, those storage elements within mirror space storage elements 137 are then copied to their corresponding storage elements of circular queue copy storage elements 142 within buffer storage elements 104, thereby creating an identical alternative Data Group (31B). Data Group (31B) is located entirely within the circular portion of the circular queue. The pointer address is next updated or "repositioned" to reflect the next available write address within the circular queue. Subsequent write operations proceed in storing future data groups into buffer storage elements 104 and updating the pointer address upon completion until physical end address 121 is once again traversed. In the first embodiment, each occurrence of writing across physical end address 121 results in copies of the portion of the most recent data or data group which is written into mirror space storage elements 137 to be copied from mirror space storage elements 137 to circular queue copy storage elements 142. The pointer address may be updated at any time after the read, write, or access process has substantially completed, and may occur before, during, or after the copying from mirror space storage elements 137 to circular queue copy storage elements 142. As described herein, the pointer update will be after the copying.

It is preferable to the size of mirror space storage elements 137 to a size sufficient to store the maximum possible data group of all possible data groups to be transmitted. To properly determine the number of storage elements within mirror space storage elements 137, the type of data, and whether the data is fixed in size, limited in size, or unknown in size is significant, For fixed and limited sized data groups, the size of mirror space storage elements 137 will be at least the fixed data size or largest possible data group size, respectively. For unknown data group sizes, the mirror space storage elements 137 cannot be sized to insure operation without overflowing the mirror space storage elements 137. As a result, for data group sizes exceeding a certain predetermined size, each data group must be pre-divided by the transmitter such that they do not exceed the cumulative size of mirror space storage elements 137. This division will be required prior to transferring the data or each data group into circular queue 100 to insure proper operation. Regardless, the mirror space must be sized to avoid any overflow while accessing the storage elements within the mirror space.

The circular queue of the present invention does not check for the positional or address status of the particular pointer or pointers in use during a substantial portion of the read or write process to the circular queue. The address status of the read or write process is determined after the one (if only one storage element need be accessed) or more (where multiple storage elements need be accessed) accesses to the storage elements is completed. This permits much more efficient use of time for the read and write processes by deleting the repetitive step of address checking or verification before or after each storage element access. This is particularly beneficial where the data rate approaches the ability of the controlling processor, controller, or input output device, system component, time available, or the like, to read or write such data, such as in a high speed serial data transfer system.

Figure 5:
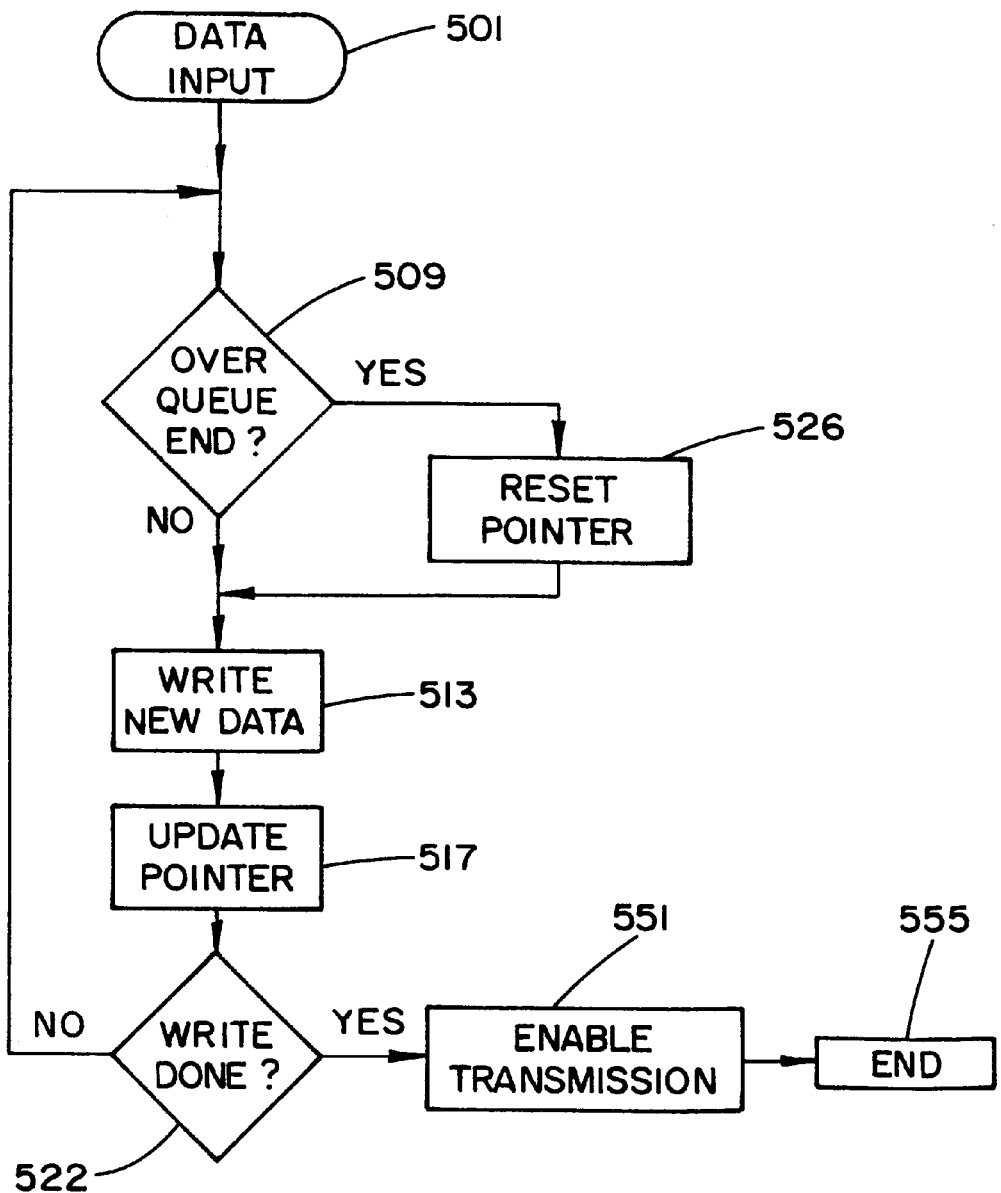
FIG. 5 is a flow chart diagram of the prior art implementation of the write process.

Referring now to FIG. 5, a flow diagram for a prior art write process to a circular queue is shown. Typically, the data is input via data input step 501. When as the write process to the circular queue begins, a check of the position or address of write address pointer 108 is done as shown by the step identified as circular queue end traversed check 509. Where the position or address of the write address pointer 108 points to a next storage element within the boundary of circular queue 200, then a single storage element is written as identified by the write storage element data step 513. The write address pointer 108 is then incremented (by a storage element address unit) as shown by update pointer address step 517. Next, an evaluation is made as to whether or not additional data remains to be written, as identified by the write complete determination step 522. Where the write to the circular queue 200 has not finished, then the steps of circular queue end traversed check 509, write storage element data step 513, update pointer address step 517, and write complete determination step 522 repeat until either all the data is written to the queue or write address pointer 108 reaches physical end address 121.

Where the position or address of write address pointer 108 points to a next storage element outside the end boundary of the circular queue 200, the pointer is 'reset', i.e., returned to the position which references logical start address 116 and physical start address 117, and the write process resumes writing storage elements at the reset pointer address. The write process within circular queue 200 then continues until such time as the write process fully completes, the read address pointer 112 is encountered, or a system event halts or terminates the write process, or the like. After the write process fully completes, then the transfer of data from the circular queue to another transfer function, routine or device is enabled as designated by enable data transmission step 551 and the data is read from the circular queue 200 and provided to the application, function, routine or device. When the queue or buffer transfer process has entirely completed, as is designated by terminate queue access step 555, all data has been written to the queue, held by the queue, and provided to the next application, function, routine, device, or the like.

Figure 6A:
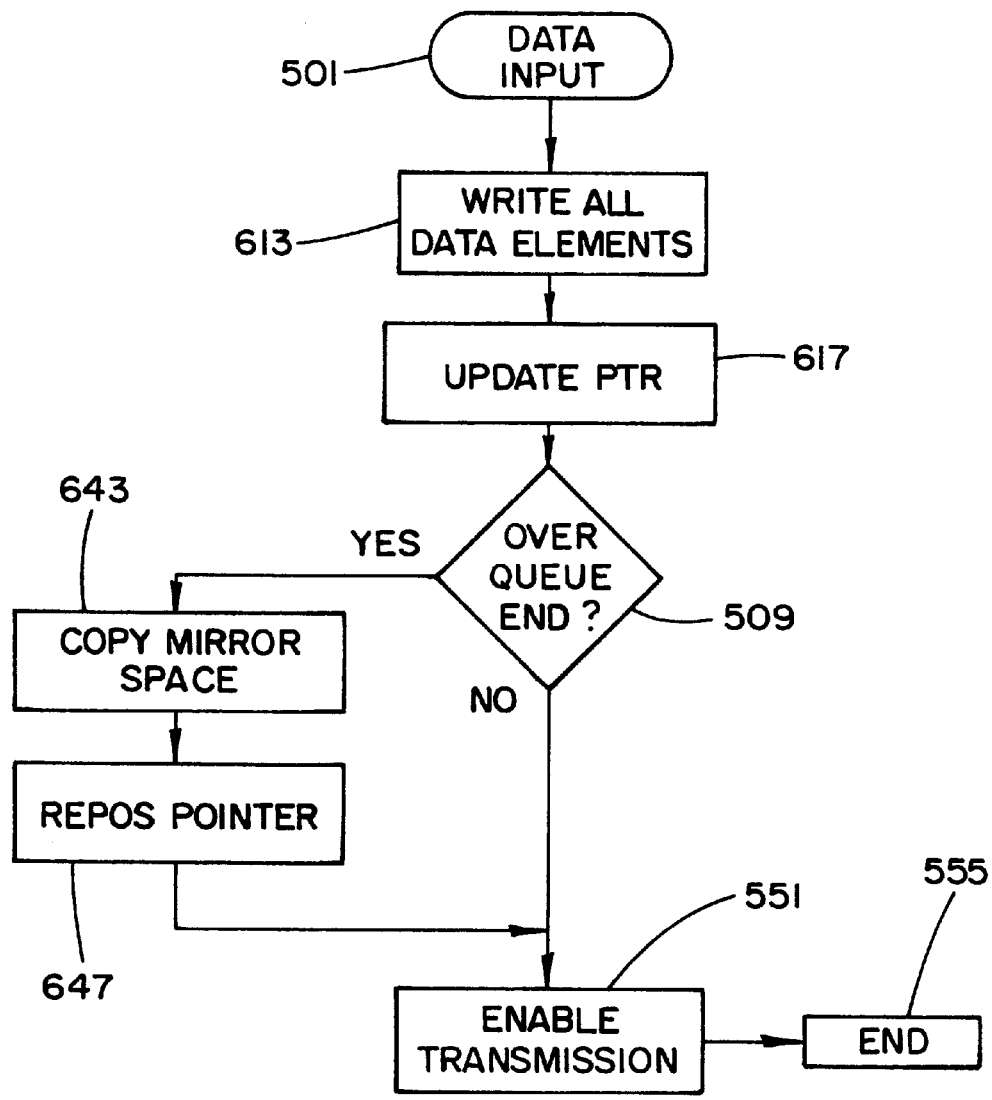
FIG. 6a is a flow chart diagram of a first write process as implemented in an embodiment of the present invention.

The flow diagram of the first embodiment of this invention is shown in FIG. 6a. Such a process flow accomplishes a write process to circular queue 100 in a manner which reduces the time to achieve the fully completed write process. As shown in FIG. 6a, by data input step 501, the data is inputted to the queue. The write process proceeds until all data input elements are written, i.e., the write process is substantially complete, as shown by write all data to storage elements step 613. Where the data to be written exceeds the number of storage elements remaining until logical end address 120 or physical end address 121 is reached, the write process continues into mirror space storage elements 137, wherein as many storage elements of mirror space storage elements 137 are used as required to substantially complete the write process to the storage elements. After all storage elements are written, the write address pointer 108 is re-determined or calculated by adding its previously known position to the number of storage elements that were written by the write process since the prior re-determination or calculation of the reposition pointer step 617. A check or verification of the pointer position is then made to determine whether or not the write process traversed the logical end address 120 or physical end address 121 of the circular queue.

If the circular queue 100 physical or logical end boundary was not traversed, then transmission of the circular queue data is enabled, as identified by enable data transmission step 551, and the write process to the circular queue 100 has entirely completed.

If the write process and therefore the write address pointer 108 address traverses the logical end address 120 or physical end address 121, then the data written into the storage elements of mirror space storage elements 137 during this write process are copied to circular queue copy storage elements 142. This copy process can be implemented using linear system level copy functions or calls, wherein only the recently written storage elements having current valid data and within mirror space storage elements 137 are copied into circular queue copy storage elements 142. This copy process is preferably accomplished by specifying the data start address (the first storage location in mirror space storage elements 137), the number of storage elements to be copied (i.e., the number of storage elements written into mirror space storage elements 137), and a first address position to write or store the data (the first storage location in circular queue copy storage elements 142 or buffer storage elements 104).

As a result the copy process, all the data within circular queue 100 exists in two types of recognized and unique queue spaces. First, all written data exists within the circular portion of circular queue 100. Second, the data likewise resides in an address continuous linear space, which starts within the circular portion of circular queue 100 and includes some or all of the storage elements within mirror space storage elements 137.

Consequently, the data for circular queue 100 can be read both by those calling or system routines or functions which operate on circular queues, and also those calling or system routines or queues which operate on (or only on) linear arrays of storage elements. Therefore, by implementing the mirror space, the write process or read process efficiency is improved and the higher level programming can be simplified or implemented by using those calling routines or functions that operate on linear only or circular only storage elements, as well as a combination of linear only and circular only functions or routines.

Figure 6B:
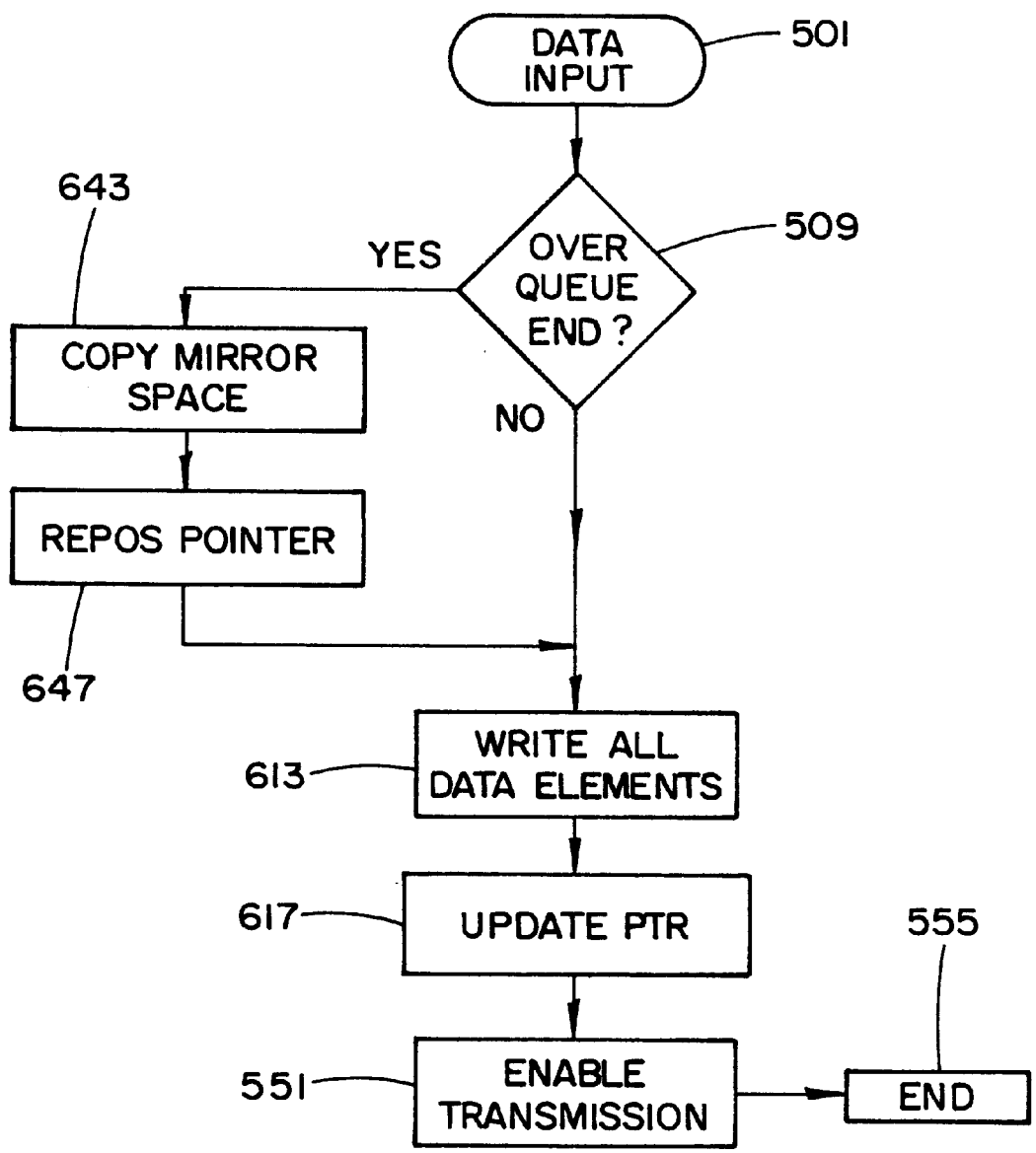
FIG. 6b is a flow chart diagram of a second write process as implemented in an embodiment of the present invention.

Alternatively, it is possible to implement the scheme of FIG. 6a, by relocating write all data to storage elements step 613 and reposition pointer step 617 to immediately precede enable data transmission step 551 and to be subsequent to circular queue end traversed check 509 'NO' path and reposition pointer step 647. Effectively, by restructuring in such a manner, a change occurs wherein the pointer position is not tested until such time as the next write or read process is beginning or scheduled. Such a restructured implementation is shown in FIG. 6b. Either implementation functions in a similar manner.

In a second embodiment, the write and read functions to the queue occur in a similar manner as the first preferred embodiment, except where after the logical end address 120 or physical end address 121 is traversed, the data within the mirror space storage elements 137 is not copied to the storage elements within circular queue 100. This creates a circular queue or buffer wherein the precise address or storage element which is last used before resetting the appropriate pointer to logical start address 116 or physical start address 117 varies due to the current written data. In effect, the data 'borrows' storage elements from mirror space storage elements 137 to complete the write process and then accesses the borrowed storage elements to complete the read process. Consequently, this particular embodiment functions best typically as a 'linear' circular queue and may not be functionally compatible with circular queue calling fuctions or routines, i.e., those circular queues which return at a particular address.

The second embodiment is advantageous where the mirror space storage elements 137 copy time is sufficient to impact the ability of the queue or buffer to accept or receive data. It is also advantageous where the programming environment uses only linear type functions and subroutines, as the necessity of maintaining circular queue structures may not justify the increased complexity of programming for various applications.

If the write process and therefore the write address pointer 108 address traverses the logical end address 120 or physical end address 121, then the data written into the storage elements of mirror space storage elements 137 during this write process is not copied to circular queue copy storage elements 142, as described above in the first embodiment, rather, the write address pointer 108 is reset to logical start address 116 or physical start address 117. After resetting write address pointer 108, the operation of the circular queue continues. Since no data is copied to the beginning of the circular queue, and the last valid storage element varies over time, then usually only linear type functions or routines will reliably function with this embodiment of the inventive concepts employed by this circular queue.

Figure 7A:
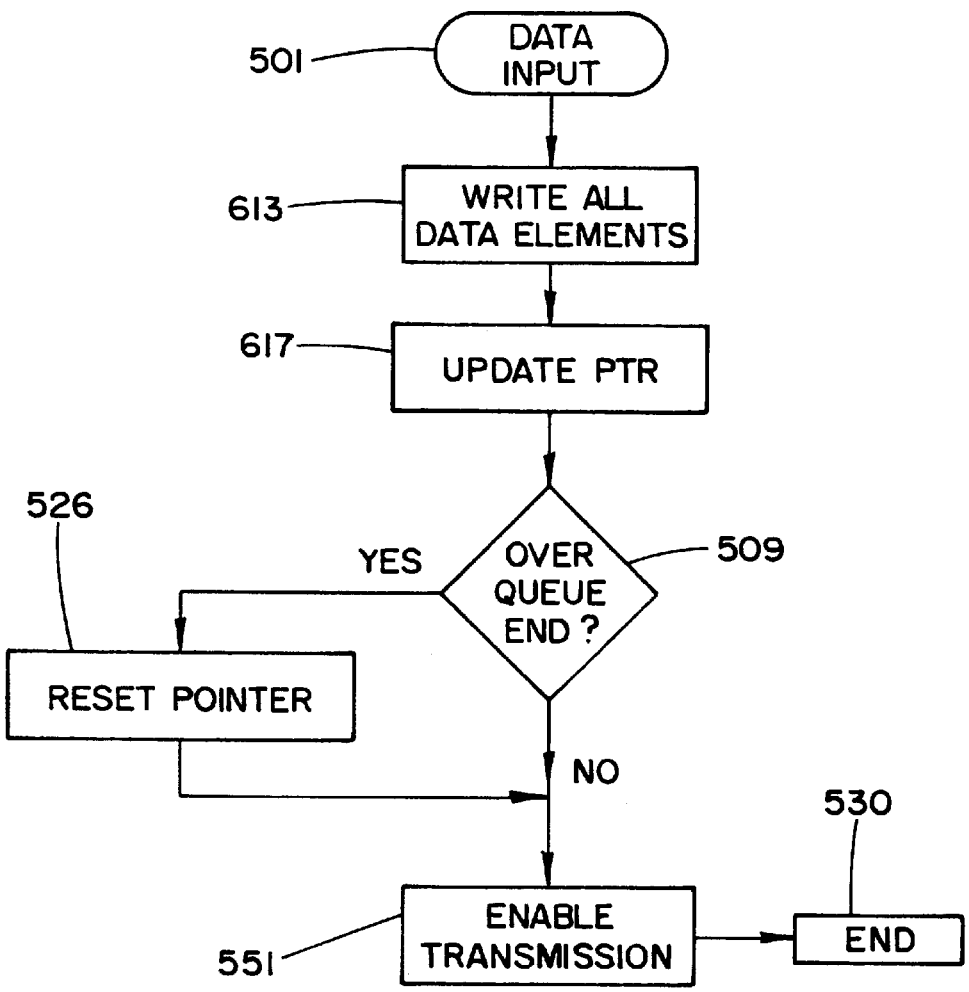
FIG. 7a is flow chart diagram of a third write process as implemented in an embodiment off present invention.

The flow diagram of the second embodiment of this invention is shown in FIG. 7a. Such a process flow accomplishes a write process to circular queue 100 in a manner which also reduces the time to achieve the fully completed write process. As shown in FIG. 7a, by data input step 501, the data is inputted to the queue. The write process proceeds until all data input elements are written, i.e., the write process is substantially complete, as shown by write all data to storage elements step 613. Where the data to be written exceeds the number of storage elements remaining until logical end address 120 or physical end address 121 is reached, the write process continues into mirror space storage elements 137, wherein as many storage elements of mirror space storage elements 137 are used as required to substantially complete the write process to the storage elements. After all storage elements are written, the write address pointer 108 is re-determined or calculated by adding its previously known position to the number of storage elements that were written by the write process since the prior re-determination or calculation of the reposition pointer step 617. A check or verification of the pointer position is then made to determine whether or not the write process traversed the logical end address 120 or physical end address 121 of the circular queue, as is shown by circular queue end traversed check 509.

If the circular queue 100 physical or logical end boundary was not traversed, then transmission of the circular queue data is enabled, as identified by enable data transmission step 551, and the write process to the circular queue 100 has entirely completed, as shown by end queue processes step 530.

If the write process and therefore the write address pointer 108 address traversed the logical end address 120 or physical end address 121, then the data written into the storage elements of mirror space storage elements 137 during this write process are not copied to circular queue copy storage elements 142. Instead, the write address pointer 108 is reset, as shown by reset pointer step 526, to either logical start address 116 or physical start address 117. Thereafter, transmission of the circular queue data is enabled, as identified by enable data transmission step 551, and the write process to the circular queue 100 has entirely completed, as shown by end queue processes step 530.

Figure 7B:
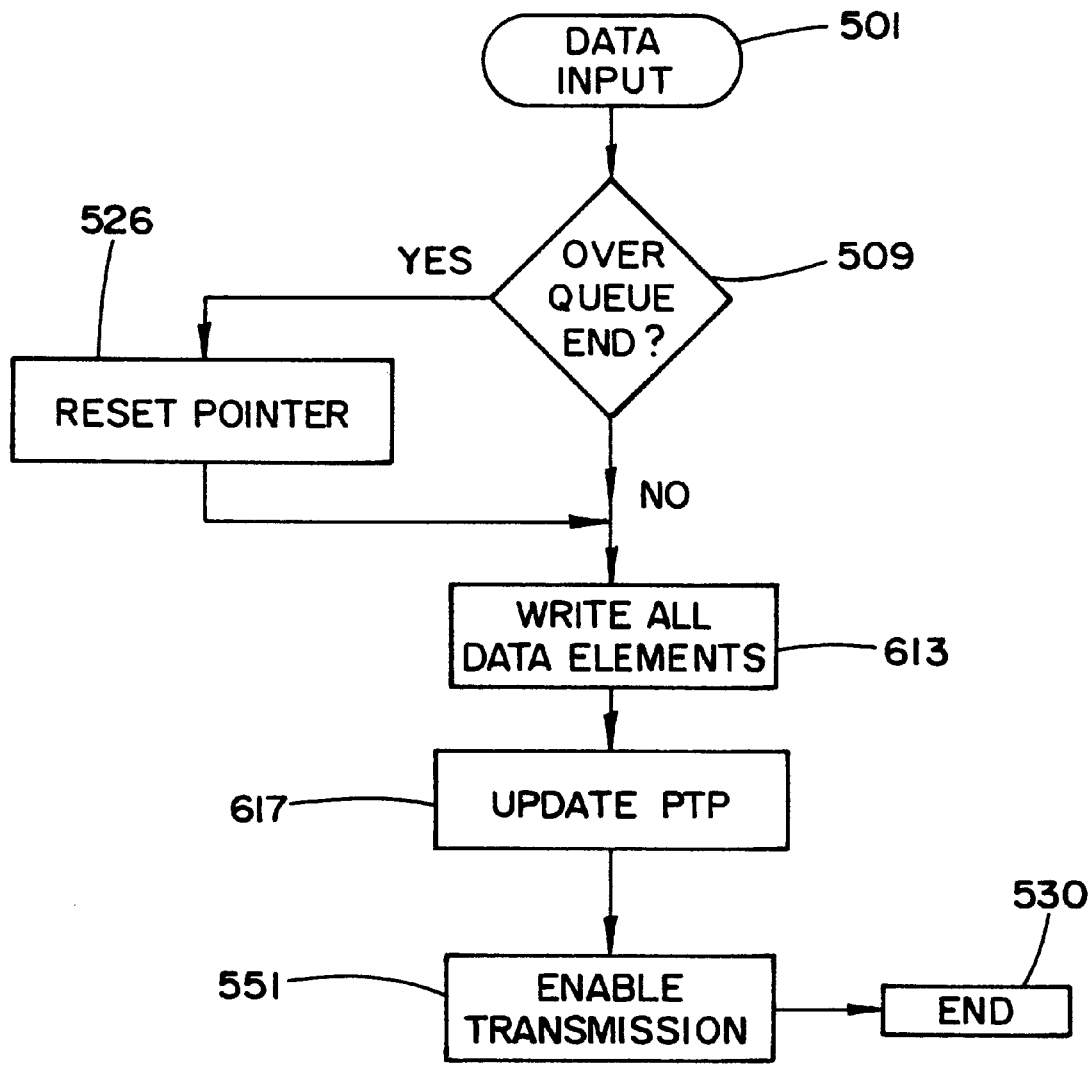
FIG. 7b is a flow chart diagram of a fourth write process as implemented in an embodiment of the present invention; and, FIG. 8 is a block diagram of a data transfer or transmission system using a preferred embodiment of the present invention.

Alternatively, it is possible to implement the scheme of FIG. 7a, by relocating circular queue end traversed check 509 and reset pointer step 526 to immediately precede write all data to storage elements step 613 and to be subsequent to data input step 501. Effectively, by restructuring in such a manner, a change occurs wherein the pointer position is not tested until such time as the next write or read process is beginning or scheduled. Such a restructured implementation is shown in FIG. 7b. Either implementation functions in a similar manner.

Figure 8:
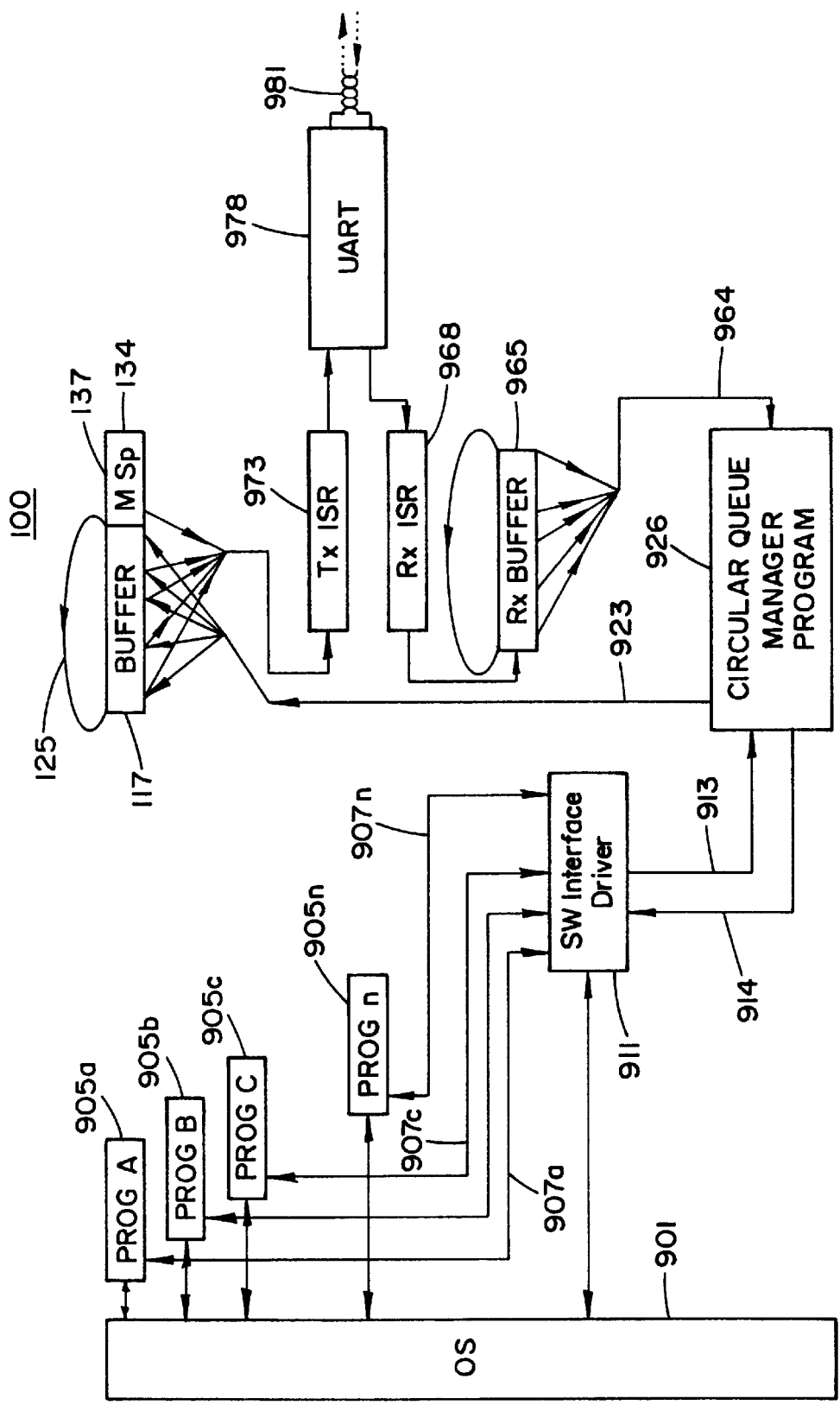

Referring next to FIG. 8, shown is an embodiment employing the circular queue with additional buffer space wherein the functionality of the improved circular queue is employed to transfer data a higher efficiency rate or efficiency of use of the transferring input/output hardware devices.

Generally, one or more of many programs will be competing for a limited number of or perhaps only one serial output device. As implied here, a serial input/output (I/O) device could include: 1) one or more simple buffers and drivers; 2) a modem device; 3) an infra-red input/output device; 4) a modem; 5) a UART device; or, more generally, 6) those devices or class of devices used to transfer data from a first device or processing unit to a second device or processing unit or to another function or area within the first device or first processing unit. As an example of the serial input/output device, and as in FIG. 8, a UART 978 is shown. The UART 978 is capable of full duplex transmission of data, and functions as the serial I/O device which transmits data across serial transmit link 981.

As using programs compete for the transfer of data using a serial I/O scheme, various implementations have been employed in the art and are well known. A first prior art scheme permits the operating system, such as Operating System 901, to arbitrate and allocate as to which one of many potential using program will actually access the serial (I/O) device and for what amount of time. Upon apparent completion of use or upon actual completion of use of the serial (I/O) device by the selected using program, complete control and or use of the device can be returned to the operating system, thereby permitting other using programs to access the serial (I/O) device. A second prior art scheme, similar to the first scheme, permits the using program to maintain exclusive control over the serial I/O device (commonly referred to as 'locking' the serial I/O device) until such time as the selected using program completes its data transfer, or is terminated. Such a scheme has typically been previously employed in transferring data to printers, or where the using program transfers data employing modems. Such schemes generally require the non-selected using programs to wait until such time as the selected using program completes its task.

In real time operating systems (RTOS) such as those implemented in cellular phones, certain tasks or using programs must be completed within a specific time. Consequently, in order to complete all such tasks in timely manners, the using programs must share the input/output resources. A manager program such as implemented by Circular Queue Manager Program 926 permits multiple access while allowing each using program to have apparent dedicated access to the limited number of serial (I/O) devices or a system's single serial I/O device.

In this embodiment, for Program A 905a, Program B 905b, Program C 905c, to Program n 905n to transfer data to a corresponding program, then the transferring program such as Program A 905a first registers with Circular Queue Manager Program 926, thereby obtaining a unique identifier. Using the identifier, Program A 905a begins transfer of data by communicating with software interface driver 911. Typically, this will be done using one or more system calls and/or using system hardware or busses which interface with software interface driver 911 identified by Program A transfer interlink 907a, Program B transfer interlink 907b, Program C transfer interlink 907c, to Program n transfer interlink 907n, for Program A 905a Program B 905b, Program C 905c, to Program n 905n, respectively. The software interface driver 911, incorporates with the data to be transferred control and transfer information bytes, and supplies circular queue 100 with the data, control and transfer information bytes, and then transfers all the data or functional control of the data to Circular Queue Manager Program 926. Whereupon, Circular Queue Manager Program 926 adds additional transferring information and either directs or transfers all of the data as modified to circular queue 100, either directly from software interface driver 911 to circular queue 100, or using transfer data interlink 913 to transfer the data from software interface driver 911 to receive buffer 965 and then to circular queue 100.

As implemented in the embodiment of FIG. 8, the data, control and transfer bytes are written into circular queue 100 using system function calls and/or internal buses associated with central processing unit (cpu) or Operating System 901. Pointer methods to identify the data within main memory are not preferred or used as the data is being consolidated into circular queue 100 for real time transfer. Such a consolidation is implemented to permit one or more programs such as Program A 905a and Program B 905b to share access to a single serial I/O device or to a limited number of serial I/O devices.

Once transfer of data is enabled, then Transmit ISR 973 or UART 978 signals the controlling cpu system or operating system its availability or status to transfer data. Bytes of data are transferred from circular queue 100 to UART 978. The Transmit ISR 973 communicates with Operating System 901 to effect a transfer of the desired data with control bytes as stored in circular queue 100 from it to UART 978. Since circular queue 100 is a FIFO type buffer, the read address pointer 112 identifies the next available data byte for transfer. As implemented here, the number of storage elements or bytes to be transferred is designated, and the read process of buffer storage elements 104 and mirror space storage elements 137 continues until all storage elements or bytes are transferred to UART 978 using Transmit ISR 973. A check or verification is then done as to whether or not the read address pointer 112 traversed the logical end address 120 or physical end address 121, and the read address pointer 112 is updated. Upon receipt of one or more of the bytes, the UART 978 processes the received data bytes, serializes the bytes into data bits, as necessary, and transmits the serialized data using serial transmit link 981 or the like.

The receive data path can also be shown by FIG. 8. As transmitted data is received from serial transmit link 981 by a corresponding receive UART 978, the data is transferred from the receive UART 978 using Receive ISR 968, and stored into receive buffer 965. The receive buffer 965 may be implemented using either a conventional write-check after every write process or a multiple-write then check process as described herein, supra. As shown in FIG. 8, the conventional write-check after every write process is implemented to avoid any possibility of data overrun of any memory past the mirror space memory address, if implemented.

Upon receipt of data by UART 978, the data is transferred using Receive ISR 968 to receive buffer 965. Once the data is stored or written into receive buffer 965, the data is transferred using a received side corresponding Circular Queue Manager Program 926 and received side corresponding software interface driver 911 to received side corresponding Program A 905a, Program B 905b, Program C 905c, and/or to Program n 905n using received side corresponding Program A transfer interlink 907a, Program B transfer interlink 907b, Program C transfer interlink 907c, and/or Program n transfer interlink 907n, respectively. Such data is delivered by the interlink to the appropriate receiving program or programs and is delivered using the system calls and/or hardware or busses of the receiving system. Typically, the data Will go through the reverse of the process of adding control and transfer data bytes as was implemented for transmission. The received side Circular Queue Manager Program 926 will control the transfer data from receive buffer 965 to received side corresponding software interface driver 911 using receive buffer interlink 964 and receive data interlink 914. Once received at software interface driver 911, the data is transferred to the appropriate receiving program or programs as designated by the control and transfer information.

Without losing generality, and except where noted, the further description of the inventive concepts will now be described in reference to a software program as shown in Appendix A which employs a circular queue including a mirror space. It will be apparent to those skilled in the arts of programming, operating system implementation, and computer design that the inventive concepts disclosed herein are equally applicable to those arts, and extend beyond those arts.

Attached in Appendix A is a modified program listing written in the "C" programming language and which implements another embodiment of the inventive concepts described herein. The structure of the program is such that a global read pointer (IsrIndex), global write pointer (FreeIndex), global queue free space available count (FreeBytesCount) integer and global transmit buffer (TxQBuf) and a local temporary pointer (tmp) are defined. The values of the read pointer and write pointer are initialized to 'MAX_SIZE_TX_QUEUE', i.e., the queue is empty (not shown). Likewise the value of the queue free space available count is initially set to the circular size of tide queue, i.e., MAX_SIZE_TX_QUEUE (initialization not shown).

The program operates by next copying data into the buffer using a memcpy call specifying the destination with tmp pointer, the source as RduRecPtr→SrcPtr and the quantity as RduRecPtr→Length. Next, tmp pointer is adjusted by adding RduRecPtr→Length, the number of bytes written. A check or verification is then made to determine whether or not the write process to the tmp pointer exceeded or traversed the circular end or overflowed into the mirror space. Where the circular end was traversed or exceeded or the data overflowed, then a second memcpy call is made to copy the mirror space data into the beginning of the circular queue (<xQMgr.TxQBuf[0]) by the number of bytes written into the mirror space, and the twp pointer is then set to the write address within the circular portion of the queue, by subtracting MAX_SIZE_TX_QUEUE from the current position of tmp. Next, the transmission of queue data is enabled by ENABLETXINT( ).

Initially, the UART will be inactive and the call to ENABLETXINT( ) will cause the cpu to register an interrupt and the interrupt service routine (ISR) will be called, The code will proceed to and make a call to LTxLoadIsr( ) and a location and a count of the data to transmit will be passed to the ISR routine. The ISR routine will load into the UART the lesser of the number of bytes to transmit or the maximum size that the UART can handle. Where the UART has been previously transmitting, then there will be additional requests for data bytes after the current data bytes have been transmitted. If there are no additional data bytes for transmission, then the ISR routine will disable transmission of data from the UART by calling DISABLETXINT( ).

LTxLoadIsr is called by the ISR when additional data bytes are requested by the ISR for transmission. If more the data is available, then LTxLoadIsr will update the data pointer in the ISR and return a count of the data bytes available in the circular queue awaiting transmission.

The above description of the preferred embodiments are provided to enable any person skilled in the art to make or use the present invention. Various modifications to these preferred embodiments will be readily apparent and capable of implementation to those persons skilled in the art. Further, various modifications to the herein disclosed preferred embodiments will be feasible without the employment of inventive faculties. Therefore, the present invention is not intended to be limited to the embodiments shown herein, rather, it should be accorded the widest permissible scope consistent with the appropriate principles and pursuant to the novel features and their disclosures herein.

APPENDIX A

```
//*************************************************************
//
//    COPYRIGHT 1998 Unpublished NEC America, Inc.
//    All Rights Reserved, EXCEPT PERMISSION IS HEREBY GRANTED TO REPRODUCE
//    THIS FIGURE FOR THE LIMITED PURPOSE OF COPYING ANY US OR FOREIGN PATENT
//    THAT MAY ISSUE CONTAINING THIS FIGURE.
//
//    THIS FILE MAY NOT BE COPIED, PRINTED OR DISTRIBUTED TO ANY UNAUTHORIZED
//    PERSON, COMPUTER, NETWORK, OR MAGNETIC MEDIA OF ANY KIND WITHOUT THE
//    EXPRESS WRITTEN CONSENT OF NEC AMERICA, INC., NEC CORP., OR THEIR
//    ASSIGNS.
//
//    PERMISSION IS HEREBY GRANTED TO REPRODUCE THIS FIGURE FOR THE LIMITED
//    PURPOSE OF COPYING ANY US OR FOREIGN PATENT THAT MAY ISSUE.
//
//
//    "..." will be used throughout to indicate 1 or more lines of code not
shown.
//
//    "//" will be used to describe the purpose of the following line of code.
//
//    This is the Link Layer Transmit Queue Manager Structure
//
//    The key elements pertaining to this invention are
//    the IsrIndex, (where the TX Isr gets the next byte to transmit)
//    the FreeIndex, (where the next open spot is to load the TX queue)
//    the FreeBytesCount, (how much room is left in the TX queue)
//    and the TxQBuf. (which is the space allocated for the TX queue)
//
typedef struct LTxQManager
{
...
        unsigned int       IsrIndex;          // read pointer
        unsigned int       FreeIndex;         // write pointer
        unsigned int       FreeBytesCount;    // of circular queue
        unsigned char      TxQBuf[MAX_SIZE_TX_QUEUE + MAX_SIZE_PACKET_LDU - 1];
}LTxQManager;
//
//    This makes an instance of type LTxQManager, as opposed to providing a
//    description of the structure like the typedef command above does.
//
static LTxQManager LTxQMgr;
//
//
//
//    This routine, LTxStaffQueue, puts data into the TX queue. How the space
is
//    allocated in the TX queue is not shown. Source data is in the RDuInfo
//    structure pointed to by RduRecPtr and QDestPtr is the same as
//    LTxQMgr.IsrIndex before the space in the TX queue was allocated.
```

APPENDIX A-continued

```c
//
unsigned char *LTxStaffQueue(RDuInfo *RduRecPtr, unsigned char *QDestPtr)
{
    unsigned char *tmp = QDestPtr;
...
    /* Staff the data bytes */
    memcpy(tmp,                          // destination
            RduRecPtr->SrcPtr,           // source
            RduRecPtr->Length);          // quantity
    tmp = tmp + (RduRecPtr->Length);     // update pointer position
...
    /*check for overflow */
    if ((char *)tmp >= (char *)<xQMgr.TxQBuf[MAX_SIZE_TX_QUEUE])
    {
        /* we have written into mirror space so */
        /* copy overflow to the beginning of Tx Queue */
        memcpy(<xQMgr.TxQBuf[0],
                /* copy to start of circular queue */
                <xQMgr.TxQBuf[MAX_SIZE_TX_QUEUE],
                /* from start of mirror space */
                (unsigned int) (tmp - <xQMgr.TxQBuf[MAX_SIZE_TX_QUEUE]));
                /* relay seq number byte minus last byte in circular buffer =
                    overflow size */
        /* correct pointer */
        tmp = tmp - MAX_SIZE_TX_QUEUE;
    }
...
    /* Enable the Tx Isr */
    ENABLETXINT( );
...
}
//
//  The LTxLoadIsr routine is called by the TX Isr when it has completed
//  transmitting all of the characters in the last block it was given.
//
unsigned int near LTxLoadIsr(unsigned char **LduStartAdrPtr)
{
    unsigned int Return_Value = 0;
...
    /* Check if next data bytes are ready to be transmitted */
    if (LTxQMgr.TxQBuf[LTxQMgr.IsrIndex] == 0xAA)
    {
        /* tell the Isr where to get the data */
        *LduStartAdrPtr = <xQMgr.TxQBuf[LTxQMgr.IsrIndex];
...
        Return_Value = 'length of data to transmit'
    }
...
    }
    return Return_Value;       // zero for no data otherwise length of data
}
//
//  This Interrupt Service Routine (ISR) handles both RX and TX interrupts
//  from the UART. Note! In the RX part that each time the pointer is
//  incremented, there is a test for queue overflow. In the TX part, no test
for
//  queue overflow is required. Data is guaranteed to be contiguous.
//
int S0RcvIsr (void)
{
...
    // get a snap shot of interrupt reason
    Mask = (unsigned char)inportb(FM_MISR);
    if ((Mask & IMR_RXLEV) || (Mask & IMR_RXSTALE))
    {
        // RX interrupt part
        do
        {
            Ch = (unsigned char)inportb( FM_RF );
            //check if not full
            if (LRxQMgr.RxBytesCount < MAX_SIZE_RX_QUEUE)
            {
                LRxQMgr.RxQBuf[LRxQMgr.RxTailIndex] = Ch;
                LRxQMgr.RxTailIndex = LRxQMgr.RxTailIndex + 1;
                if (LRxQMgr,RxTailIndex >= MAX_SIZE_RX_QUEUE)
                {
                    LRxQMgr.RxTailIndex = 0;
                }
                LRxQMgr.RxBytesCount = LRxQMgr.RxBytesCount + 1;
```

APPENDIX A-continued

```
        }
    }
    while (SR_RXRDY & inportb(FM_SR)); //empty all the RX FIFO
}
// is this a TX interrupt?
if (IMR_TXLEV & inportb(FM_MISR))
{
    // TX interrupt part
    if (TxBytesCount <= 0)
    {
        //reload next service
        TxBytesCount = (int) (*LTxLoadIsrPtr) (&Ptr);
        if (TxBytesCount == 0)
        {
            //nothing to transmit
            DISABLETXINT( );

return 0;
        }
    }
    if (TxBytesCount <= MAX_TX_LOAD_CHRS)
    {
        Cnt = TxBytesCount;
    }
    else
    {
        Cnt = MAX_TX_LOAD_CHRS.;
    }
    TxBytesCount = TxBytesCount - Cnt;
    // load in TX FIFO 32 bytes or remaining bytes
    while (Cnt)
    {
        outportb((unsigned int) (FM_TF), *Ptr);
        Ptr = Ptr + 1; // pointer is incremented without checking for
overflow
        Cnt = Cnt - 1;
    }
}
return 0;
}
```

What is claimed is:

1. A method of using a circular queue comprising:
accessing a queue first storage element within a circular portion of the queue and identified by an access pointer;
accessing a queue second storage element outside the circular portion of the queue after traversing an end of the circular portion; and
adjusting the access pointer by a value representing the number of storage elements accessed.

2. The method of claim 1, wherein the step of adjusting the access pointer includes updating and checking the access pointer.

3. The method of claim 2, wherein the step of updating the access pointer includes adding to the access pointer a value representing the number of storage elements accessed.

4. The method of claim 3, wherein the value is derived from the number of storage elements accessed since a prior adjusting of the access pointer.

5. The method of claim 3, wherein the step of adjusting the access pointer is done using the number of storage elements accessed and the number of storage elements within the circular portion.

6. The method of claim 3, wherein the step of adjusting the access pointer is done using a modulus of the sum of the number of storage elements accessed since a prior adjusting of the access pointer and a prior access pointer value, and wherein the modulus is calculated by using the number of storage elements within the circular portion.

7. The method of claim 3, wherein the step of checking the access pointer includes determining whether the access pointer traversed the end of the circular portion by comparing the access pointer's position to the end of the circular portion.

8. The method of claim 7, wherein the step of determining whether the access pointer traversed the end includes comparing an address of the access pointer to an address of the end of the circular portion.

9. The method of claim 7, wherein the step of determining whether the access pointer traversed the end includes verifying the access pointer exceeded the end address of the circular portion.

10. The method of claim 7, wherein the access pointer is a read pointer and wherein the step of accessing a queue second storage element includes reading a storage element.

11. The method of claim 7, wherein the access pointer is a write pointer and wherein the step of accessing a queue second storage element includes writing a storage element.

12. The method of claim 1, wherein in the step of adjusting the access pointer the value used derives from the logical address representing the start of the circular queue.

13. The method of claim 1, wherein in the step of adjusting the access pointer the value used derives from the physical address representing the start of the circular queue.

14. The method of using a circular queue of claim 1 further comprising copying data from the second storage element to a storage element within the circular queue.

15. A method of using a circular queue comprising:
accessing a first plurality of storage elements within a circular portion of the queue wherein one of the first plurality of storage elements is identified by an access pointer;

accessing a second plurality of storage elements outside the circular portion of the queue after traversing an end of the circular portion; and adjusting the access pointer by a value representing the number of storage elements accessed.

16. The method of claim 15, wherein the step of adjusting the access pointer includes updating and checking the access pointer.

17. The method of claim 16, wherein the step of updating the access pointer includes adding to the access pointer a value representing the number of storage elements accessed.

18. The method of claim 17, wherein the value is derived from the number of storage elements accessed since a prior adjusting of the access pointer.

19. The method of claim 17, wherein the step of adjusting the access pointer is done using the number of storage elements accessed and the number of storage elements within the circular portion.

20. The method of claim 17, wherein the step of adjusting the access pointer is done using a modulus of the sum of the number of storage elements accessed since a prior adjusting of the access pointer and a prior access pointer value, and wherein the modulus is calculated by the number of storage elements within the circular portion.

21. The method of claim 17, wherein the step of checking the access pointer includes determining whether the access pointer traversed the end of the circular portion by comparing the access pointer's position to the end of the circular portion.

22. The method of claim 21, wherein the step of determining whether the access pointer traversed the end includes comparing an address of the access pointer to an address of the end of the circular portion.

23. The method of claim 21, wherein the step of determining whether the access pointer traversed the end includes verifying the access pointer exceeded the end address of the circular portion.

24. The method of claim 21, wherein the access pointer is a read pointer and wherein the step of accessing a queue second storage element includes reading a storage element.

25. The method of claim 21, wherein the access pointer is a write pointer and wherein the step of accessing a queue second storage element includes writing a storage element.

26. The method of claim 15, wherein in the step of adjusting the access pointer the value used derives from the logical address representing the start of the circular queue.

27. The method of claim 15, wherein in the step of adjusting the access pointer the value used derives from the physical address representing the start of the circular queue.

28. The method of using a circular queue of claim 15 further comprising copying data within the second plurality of storage elements to within the circular queue.

29. A circular queue comprising:

a first plurality of storage elements including an end storage element each storage element being within a circular path of the queue for storing a first portion of first data;

a second plurality of storage elements each outside the circular path of the queue wherein one of the second plurality of storage elements is address continuous to one of the first plurality of storage elements and for storing a second portion of first data;

a write pointer for designating a storage element within the first plurality of storage elements to write; and a read pointer for designating a storage element within the first plurality of storage elements to read.

30. The circular queue of claim 29, wherein each of the plurality of first storage elements and each of the plurality of second storage elements are logically address continuous.

31. The circular queue of claim 29, wherein each of the plurality of first storage elements and each of the plurality of second storage elements are physically address continuous.

32. The circular queue of claim 29, further comprising a plurality of designated storage elements within the first plurality of storage elements for storing the second portion of first data in the circular path and address sequential with the first portion of first data.

33. The circular queue of claim 32, wherein address sequential includes repositioning the write pointer.

34. The circular queue of claim 32, wherein address sequential includes repositioning the read pointer.

* * * * *